United States Patent
Lee et al.

(10) Patent No.: US 8,407,715 B2
(45) Date of Patent: Mar. 26, 2013

(54) LIVE RANGE SENSITIVE CONTEXT SWITCH PROCEDURE COMPRISING A PLURALITY OF REGISTER SETS ASSOCIATED WITH USAGE FREQUENCIES AND LIVE SET INFORMATION OF TASKS

(75) Inventors: Jenq Kuen Lee, Hsinchu (TW); Kun Yuan Hsieh, Hsinchu (TW); Yung Chia Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1485 days.

(21) Appl. No.: 11/742,322

(22) Filed: Apr. 30, 2007

(65) Prior Publication Data

US 2008/0270771 A1    Oct. 30, 2008

(51) Int. Cl.
*G06F 9/46*    (2006.01)
*G06F 7/38*    (2006.01)

(52) U.S. Cl. .................................. 718/108; 712/228
(58) Field of Classification Search .................. None
See application file for complete search history.

(56) References Cited

U.S. PATENT DOCUMENTS

| | | | | | |
|---|---|---|---|---|---|
| 5,974,512 | A | * | 10/1999 | Chiba | 711/162 |
| 5,987,258 | A | * | 11/1999 | Daniel et al. | 717/124 |
| 6,188,411 | B1 | * | 2/2001 | Lai | 345/559 |
| 6,408,325 | B1 | * | 6/2002 | Shaylor | 718/108 |
| 6,609,249 | B2 | * | 8/2003 | Kunz et al. | 717/161 |
| 7,908,603 | B2 | * | 3/2011 | Klingman | 718/100 |
| 7,937,710 | B1 | * | 5/2011 | Silkebakken et al. | 718/108 |
| 8,042,116 | B2 | * | 10/2011 | Kurata | 718/107 |
| 2005/0044539 | A1 | * | 2/2005 | Liebenow | 717/154 |
| 2005/0149556 | A1 | * | 7/2005 | Shiga | 707/104.1 |
| 2005/0278707 | A1 | * | 12/2005 | Guilford | 717/130 |
| 2006/0048124 | A1 | * | 3/2006 | Martin | 717/160 |
| 2006/0149940 | A1 | * | 7/2006 | Mukherjee | 712/228 |
| 2006/0195707 | A1 | * | 8/2006 | Rychlik | 713/300 |
| 2006/0212863 | A1 | * | 9/2006 | Warnes | 717/159 |
| 2006/0242388 | A1 | * | 10/2006 | Tremblay et al. | 712/228 |
| 2007/0136733 | A1 | * | 6/2007 | Park et al. | 718/108 |

OTHER PUBLICATIONS

TMS320 DSP/BIOS User's Guide, Manuel, Nov. 2004, Texas Instruments Incorporated, Texas USA.
Tay-Jyi Lin et al., A Novel Register Organization for VLIW Digital Signal Processors, Journal, 2005, National Chiao Tung University, IEEE, Taiwan.
Scott Rixner et al., Register Organization for Media Processing, Journal, 2000, HPCA6, Stanford Universty and Massachusetts Institute of Technology, USA.
Chingren Lee et al., Compiler Optimization on Instruction Scheduling for Low Power, Journal, 2000, National Tsing-Hua University and National Chi-Nan University, IEEE, Taiwan.
Yi-Ping You et al., Compilers for Leakage Power Reduction, Journal, Jan. 2006, vol. 11 No. 1, ACM Transactions on Design Automation of Electronic Systems.

(Continued)

*Primary Examiner* — Meng An
*Assistant Examiner* — Tammy Lee
(74) *Attorney, Agent, or Firm* — WPAT, P.C.; Anthony King

(57) ABSTRACT

A method of optimizing multi-set context switch for embedded processors includes the steps of partitioning a plurality of registers into a plurality of register sets based on a live-range-sensitive context-switch procedure that is associated with a usage frequency of each of the registers, storing contents of first target registers according to live set information of a current task, wherein the first target registers are selected from the register sets, determining a next task by an operating system and updating the live set information according to the next task, and restoring contents of second target registers according to the updated live set information, wherein the second target registers are selected from the register sets.

13 Claims, 4 Drawing Sheets

OTHER PUBLICATIONS

Peng-Sheng Chen et al., Interprocedural Probabilistic Pointer Analysis, Journal, Oct. 2004, vol. 15 No. 10, IEEE Transactions on Parallel and Distributed Systems, Computer Society.

Cheng-Wei Chen et al., ORC2DSP: Compiler Infrastructure Supports for VLIW DSP Processors, Journal, National Tsing Hua University, Taiwan.

OMAP5910 Dual-Core Processor, Manual, 2003, Texas Instruments Incorporated, Texas USA.

David Chih-Wei Chang et al., PAC DSP Core and Application Processors, Journal, 2006, Industrial Technology Research Institute, IEEE, Taiwan.

Yung-Chia Lin et al., Compiler Supports and Optimizations for PAC VLIW DSP Processors, Journal, National Tsing-Hua University, Taiwan.

Radhika Thekkath et al., The Effectiveness of Multiple Hardware Contexts, Journal, Oct. 5-7, 1994,University of Washington, ASOLPS, California USA.

Anant Agarwal et al., APRIL: A Processor Architecture for Multiprocessing, Journal, Massachusetts Institute of Technology.

Arnie Reynoso et al., DSP/BIOS Timing Benchmarks for Code Composer Studio v2.2, Report, Apr. 2004, Texas Instruments Incorporated, Texas USA.

Robert A. Iannucci et al., Toward a Dataflow / Von Neumann Hybrid Architecture, Journal, 1988, IBM Corporation and MIT Laboratory for Computer Science, IEEE.

Wolf-Dietrich Weber et al., Exploring the Benefits of Multiple Hardware Contexts in a Multiprocessor Architecture: Preliminary Results, Journal, 1989, Stanford University, ACM.

Peter R. Nuth et al., A Mechanism for Efficient Context Switching, Journal, 1991, Massachusetts Institute of Technology, IEEE.

Vijayaraghavan Soundararajan et al., Dribbling Registers: A Mechanism for Reducing Context Switch Latency in Large-Scale Multiprocessors, Journal, Nov. 6, 1992, Massachusetts Institute of Technology.

Jeffery S. Snyder et al., Fast Context Switches: Compiler and Architectural Support for Preemptive Scheduling, Journal, Florida State University.

Behrouz Zolfaghari, A Dynamic Scheduling Algorithm with Minimum Context Switches for Spacecraft Avionics Systems, Symposium, Iran University of Science and Technology, IEEE Aerospace Conference Proceedings.

Volker Barthelmann, Inter-Task Register-Allocation for Static Operating Systems, Journal, 2002, Universitat Erlangen-Nurnberg, ACM, Germany.

* cited by examiner

LIVE RANGE SENSITIVE CONTEXT SWITCH PROCEDURE COMPRISING A PLURALITY OF REGISTER SETS ASSOCIATED WITH USAGE FREQUENCIES AND LIVE SET INFORMATION OF TASKS

BACKGROUND OF THE INVENTION

1. Field of the Invention

The present invention relates to a method of optimizing multi-set context switch for embedded processors, and more particularly to a method of optimizing multi-set context switch for embedded VLIW (very long instruction word) processors.

2. Description of the Related Art

The development of embedded systems has attained rapid growth in recent years. These embedded systems are widely used in industry in a variety of ways, such as communication, multimedia and automotive control systems. With the current progress in the silicon technology, implementing embedded systems using the system-on-chip (SoC) designs becomes preferable to assembled ASICs due to issues of cost, performance and power consumption. The ITRS (International Technology Roadmap for Semiconductor. http://public.itrs.net) roadmap describes the design trend of the SoC towards the involvement of multi-core organization, which demands increasing integration of MPU, DSP, I/O cores, etc. FIG. 1 shows a conventional multi-core SoC architecture 1 including a MPU core 11 running the main application, plural dedicated process cores 12 (e.g., DSP), other IP 13 (e.g., memory, peripherals) and an interconnect 14, which is adopted by most designers and products, to achieve application-specific granularity and flexibility by using more efficient cores with dedicated functions. In contrast to the classic computer architecture of multiprocessor systems, the programming and interfacing between the heterogeneous processors within the conventional multi-core SoC architecture 1 are usually provided by different models. Moreover, the dedicated process cores 12 (i.e., the included heterogeneous processors) with different instruction sets increase the complexity of developing applications. Programming at the assembly level today will not be easy anymore in the future. System software support such as compiler and OS will play a more important role than ever.

For supporting more effective application development in a multi-core system, the software organization should be customized for each processor core, as a stack of layers on top of the hardware. In the past, many of the programs developed on the dedicated processors are implemented as the mixtures of the functional code and the specific code, which perform minor scheduling and resource management, without separate layers. This non-layered design scheme limits the flexibility/portability and turns into one of the bottlenecks in the SoC software design. As a result, a layer of OS services is usually demanded to minimize the difficulty of handling multitasking, complex inter-process communication, and miscellaneous resource management. The MPU core 11 (i.e., the main processor core) typically reuses a state-of-art embedded OS to support complete services and managements at the application level. However, using a generic OS to support function-specific programs running on the dedicated process core 12 (e.g., DSP) is not realistic due to code size and performance reasons. Therefore, a customized kernel-style lightweight. OS service is more preferable when applied to support the dedicated processor programming in recent years. Texas Instruments, for example, has developed DSP/BIOS for all platforms using their DSP products (Texas Instruments, Inc. TMS320 DSP/BIOS User's Guide, November, 2001). In addition, to reduce the amount of read and write ports in register files of the VLIW architectures for reducing power and cost in designs, distributed register file and multi-bank register architectures are being adopted for high-performance and low power VLIW DSP processors (refer to Tay-Jyi Lin et al, Proceedings of 2005 IEEE International Symposium on VLSI design, Automation and Test, 2005, 335-338 and S. Rixner et al, International Symposium on High Performance Computer Architectures, 2000, 375-386). The distributed register file and multi-bank register architectures present challenges for micro-kernel designs in reducing context switch overhead.

SUMMARY OF THE INVENTION

An aspect of the present invention is to provide a method of optimizing multi-set context switch for embedded processors, which reduces the overhead of register transition while performing multitasking. By using the live-range information of all registers utilized in the compiler generated code, the method of optimizing multi-set context switch for embedded processors of the present invention can determine the appropriate partition of context set and direct the compiler to generate multi-set descriptions of context switch, trying to minimize the context size at each context-switch point via an optimal set-sensitive context switch algorithm.

The method of optimizing multi-set context switch for embedded processors includes the steps of: (a) partitioning a plurality of registers into a plurality of register sets based on a live-range-sensitive context-switch procedure that is associated with an usage frequency of each of the registers; (b) storing contents of first target registers according to live set information of a current task, wherein the first target registers are selected from the register sets; (c) determining a next task by an operating system and updating the live set information according to the next task; and (d) restoring contents of second target registers according to the updated live set information, wherein the second target registers are selected from the register sets.

The method of optimizing multi-set context switch for embedded processors of the present invention, which can be used in the VLIW architectures with registers scattered in multiple banks/files, employs a multi-set context-switch concept with the compiler assistance to determine an optimal partition for each register bank/file. The multi-set context-switch divides the registers in a register bank/file into several register sets to implement the idea of saving partial context without hardware support. A register set is assumed to be live if any of the registers in the register set is used at a specific time. With the live information of each register set, the implemented multi-set context-switch used by the present invention can save and restore only the register sets that are live to reduce context saving overhead. To optimize the partition of the registers, a compiler is needed to support the provision of the live range information of the registers.

BRIEF DESCRIPTION OF THE DRAWINGS

The invention will be described according to the appended drawings in which.

DETAILED DESCRIPTION OF THE INVENTION

Figure 1:
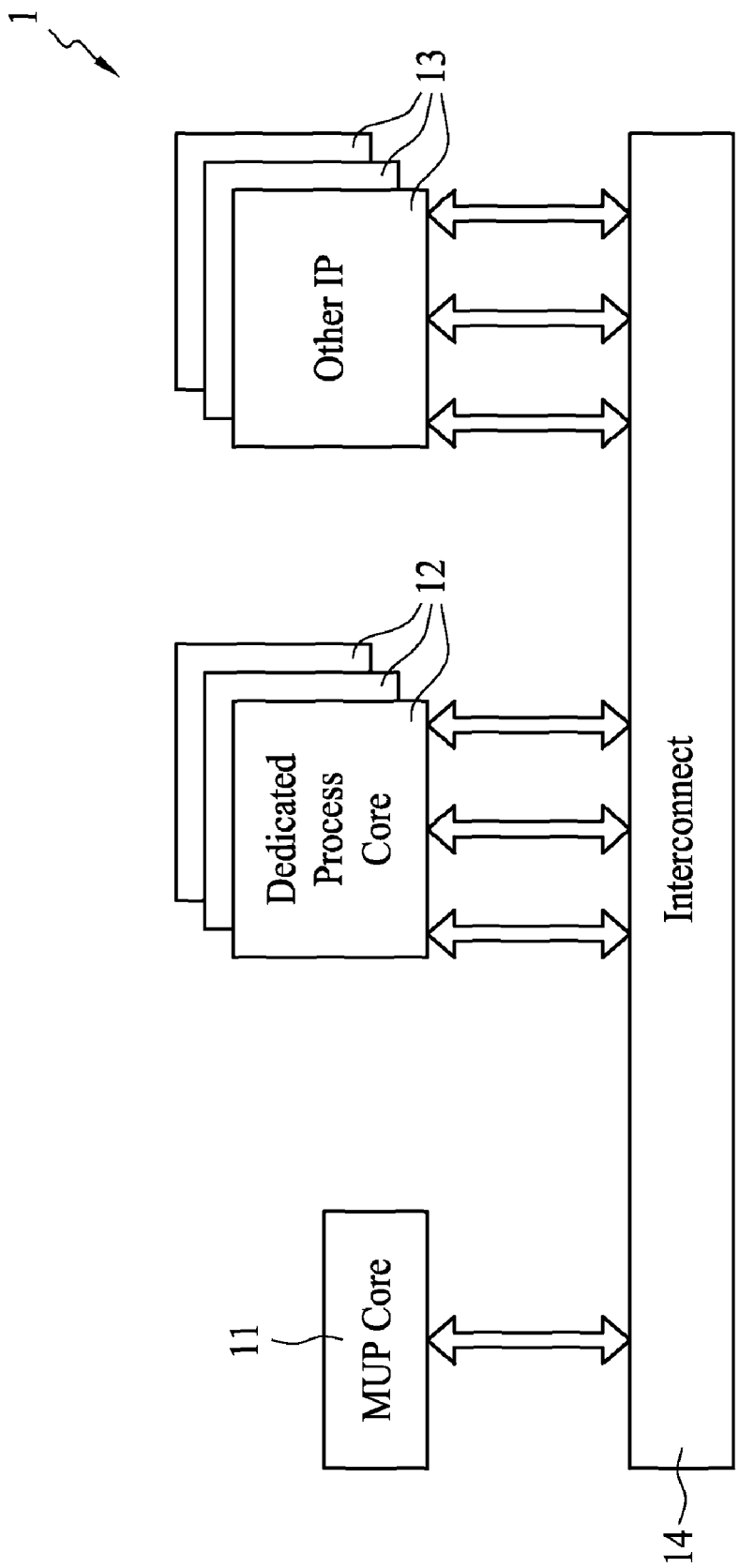
FIG. 1 shows a conventional multi-core SoC architecture.
Figure 2:
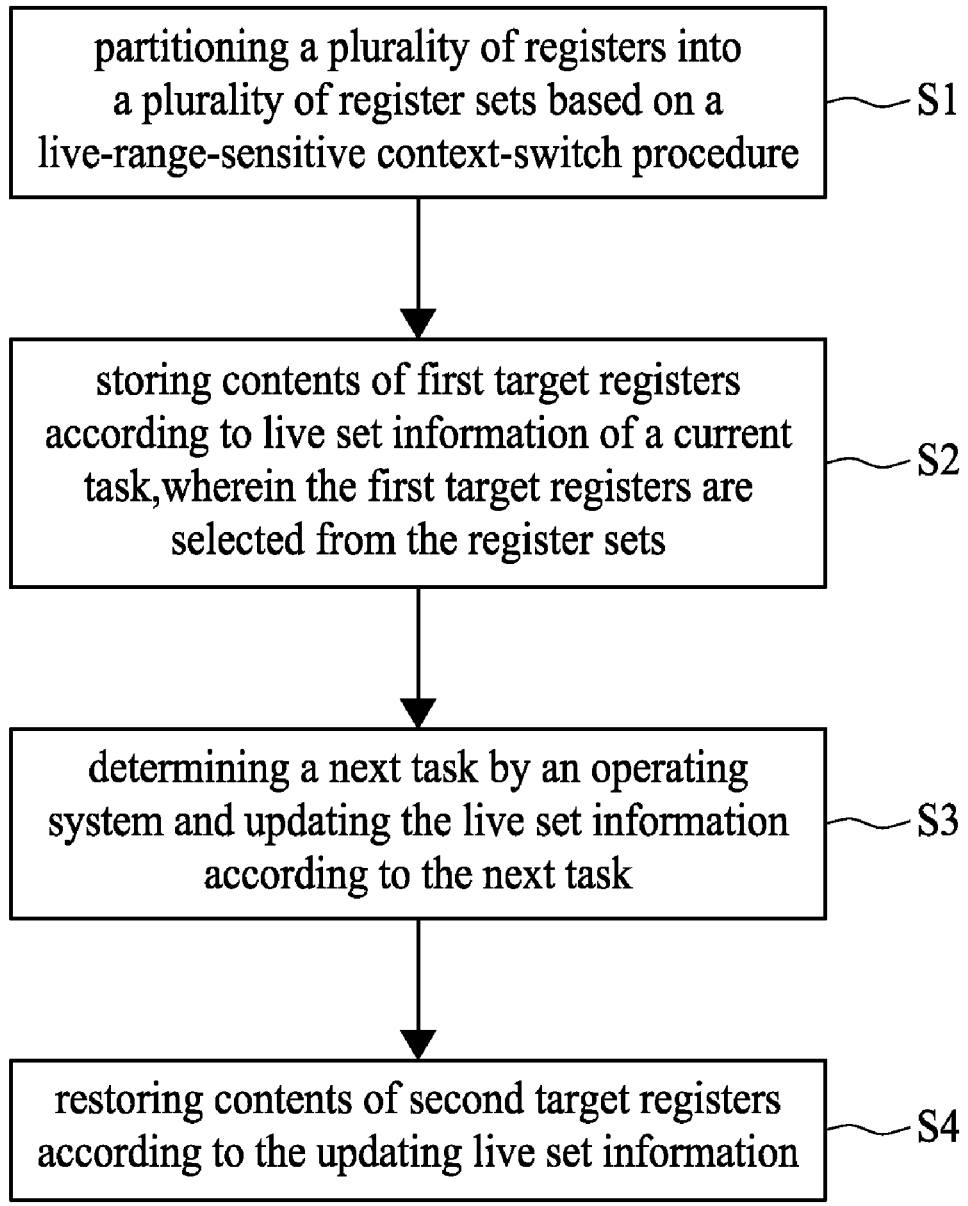
FIG. 2 shows the flow of one embodiment of the method of optimizing multi-set context switch for embedded processors according to the present invention.

FIG. 2 shows the flow of one embodiment of the method of optimizing multi-set context switch for embedded processors according to the present invention. First, a plurality of registers in the system is partitioned into a plurality of register sets $SET_i$ based on a live-range-sensitive context-switch procedure that is associated with a usage frequency of each of the register set $SET_i$ (Step S1). All registers in the VLIW architecture are partitioned into plural register sets that are labeled with an index in the range of $1, 2 \ldots k$. The register sets are arranged in the order of decreasing usage frequency of each of the register sets and with increasing indices. That is, the register set $SET_i$ is assumed to be less used as a context than the register set $SET_{i-1}$. When a running task (or a current task) is preempted, the live set information generated by the compiler is checked to support a kernel determining how much context to be stored. The live set information is stored in a live-set-information register $R_{lsi}$ with a value j indicating the appropriate register sets to be stored at the current context-switch point. Each register in the union $U_{i=1,2\ldots j} SET_i$, where $1 \leq j \leq k$, should be stored by the kernel. The live-range-sensitive context-switch procedure will be described in detail later. Second, the contents of first target registers are stored according to the live set information of the current task, and the first target registers are selected from the register sets $SET_i$ (Step S2). The first target registers are selected from the register sets by the steps of providing a first threshold value generated from the live set information, providing a first union set including the register sets with indices not less than the first threshold value, and collecting the registers in the first unit set to from the first target registers. Third, a next task is determined by a compiler and the live set information is updated according to the next task (Step S3). The second target registers are selected from the register sets by the steps of providing a second threshold value generated from the updated live set information, providing a second union set including the register sets with indices not less than the second threshold value, and collecting the registers in the second unit set to from the second target registers. Fourth, the contents of second target registers are restored according to the updated live set information and the second target registers are selected from the register sets (Step S4). The method of optimizing multi-set context switch for embedded processors of the present invention employs a multi-set representation to define the live set information of the register sets $SET_i$ as follows. For each setting of the live-set-information register $R_{lsi}$ in a program, if any register R may be live at some point before the next possible updating of the live-set-information register $R_{lsi}$, the minimal union $\cup SET_{i,i=1,2\ldots j}$ containing the register R, where $1 \leq j \leq k$, is supposed to be alive. The compiler maintains the value j in the live-set-information register $R_{lsi}$ by adding some extra instructions to the running program during the code generation time. If any register R in the register set $SET_i$ may be live at the current context-switch point, the live-set-information register $R_{lsi}$ is set to the value j.

Figure 3:
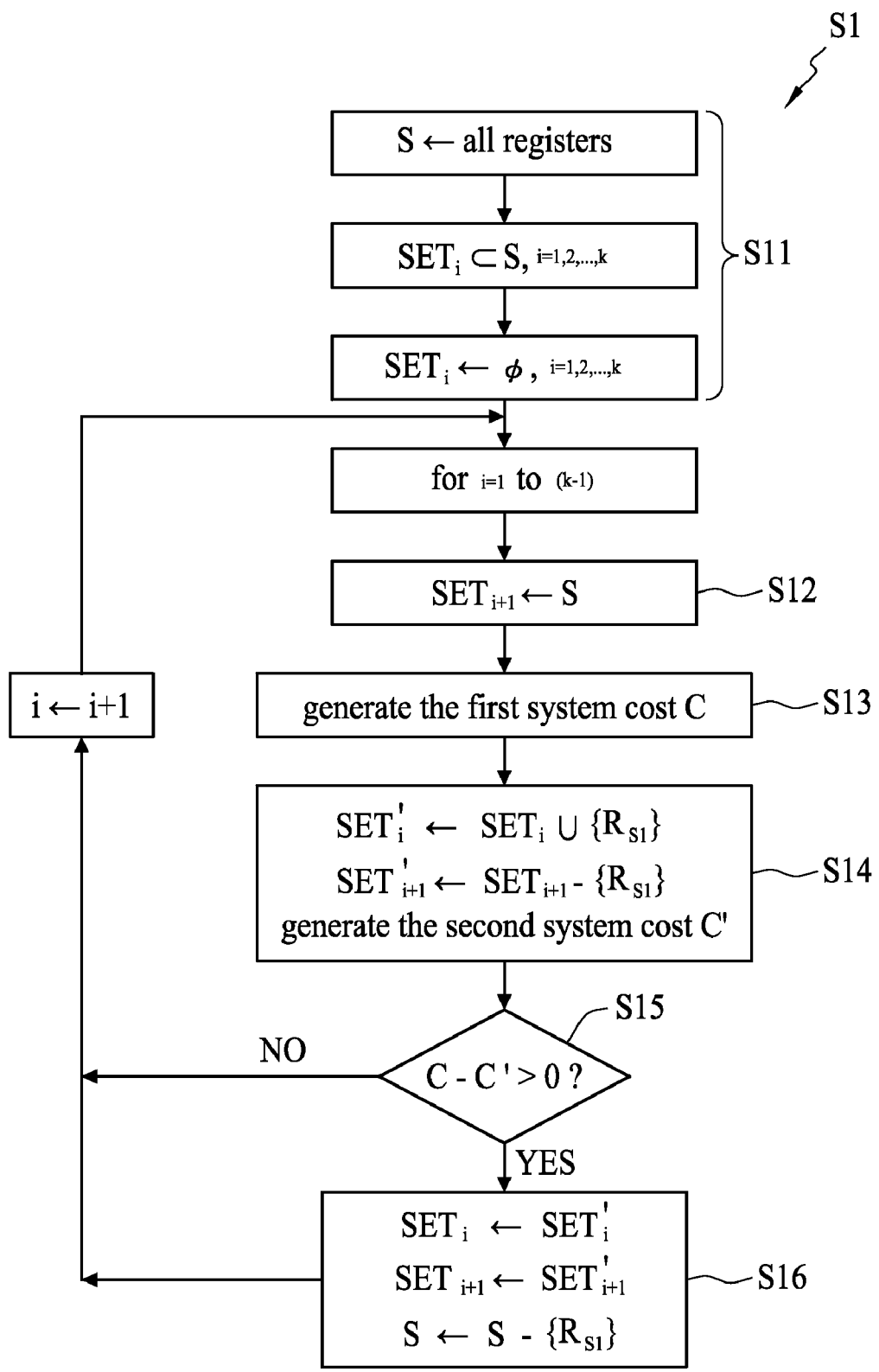
FIG. 3 shows the flow of the live-range-sensitive context-switch procedure of FIG. 2.

FIG. 3 shows the flow of the live-range-sensitive context-switch procedure in Step S1 of FIG. 2. At Step S11, a base set S including all the registers may be used is provided as input and k subsets $SET_i$ (register sets in the current embodiment and k is a positive integer) of the base set S are provided. The subsets $SET_i$ are arranged in order, where $i=1, 2 \ldots k$. Initially, each of the subsets $SET_i$ is set to be empty. Since the compiler reuses any register when possible, a longest-live register $R_{S1}$ having the longest live time in the base set S is regarded as the next register for selection for the reason that the cost of each subset $SET_i$ is correlated to the live time of the longest-live register $R_{S1}$. The set selection of the live-range-sensitive context-switch procedure decides the content of the subset $SET_i$, where $i=1, 2 \ldots k$, from the base set S sequentially. Next, at Step S12, all the registers in the base set S are assigned into the subset $SET_{i+1}$. The subset $SET_{i+1}$ is called a key subset that contains the longest-live register $R_{S1}$ selected from the registers. Then, at Step S13, a first system cost C is generated, which is associated with the subsets $SET_j$ (including the key subset $SET_{i+1}$), where $j=1, 2 \ldots k$. After that, at Step S14, the longest-live register $R_{S1}$ is moved from the key subset $SET_{i+1}$ to the subset $SET_i$ (i.e., a preceding subset to the key subset $SET_{i+1}$) so as to form a second temporary subset $SET_{i+1}'$ and a first temporary subset $SET_i'$, respectively. Then, a second system cost C' is generated, which is associated with the first and the second temporary subsets $SET_i'$ and $SET_{i+1}'$ and other subsets ($SET_j, j=1, 2 \ldots k, j \neq i, j \neq i+1$) excluding the key subset $SET_{i+1}$ and the preceding subset $SET_i$. Next, a judgment is performed. At Step S15, the first system cost C is compared to the second system cost C'. If the second system cost C' is less than the first system cost C, it means that the new selection for the content of the k subsets causes less overhead, thus the longest-live register $R_{S1}$ is moved from the key subset $SET_{i+1}$ to the preceding subset $SET_i$ and removed from the base set S. That is, the preceding subset $SET_i$ is updated by the first temporary subset and the key subset $SET_{i+1}$ is updated by the second temporary subset (refer to Step S16). Otherwise, the current selection of registers in the preceding subset $SET_i$, before the longest-live register $R_{S1}$ is moved to the preceding subset $SET_i$, is a better choice. The same process continues with the subset $SET_{i+1}$ until the selection for the k subsets is determined. The first system cost C or the second system cost C' could be defined as formula (1) below.

$$C (\text{or } C') = C_{cmp}(k) + \sum_{i=1}^{k} P_i \times C_{sl}(N_i) \tag{1}$$

where $C_{cmp}(k)$ (i.e., comparison cost) is the cost function of deciding the live set information before performing context switch if the system has k subsets in the configuration, $C_{sl}(N_i)$ (i.e., single cost) is the cost function of store and load $N_i$ registers in the subset $SET_i$ ($N_i$ is a positive integer), $P_i$ is the probability of the subset $SET_i$ being live at a given time. The single cost $C_{sl}(N_i)$ is correlated to the architecture and the support of store/load/instructions of the system. The term $$\sum_{i=1}^{k} P_i \times C_{sl}(N_i)$$

is also called a store-load cost that is defined as the sum of products of each single cost $C_{sl}(N_i)$ and its corresponding probability $P_i$ of being live (or living probability). In a real system, the overhead caused by the subset $SET_i$ is correlated to its live time $t_i$ over the total execution time t of the real system, where the live time $t_i$ of the subset $SET_i$ is defined as the sum of all intervals while any register in the subset $SET_i$ may be live. Consequently, the living probability $P_i$ is equal to $$\frac{t_i}{t}.$$

Since the compiler can utilize the allocation of the registers in each basic bank that is a straight-line piece of code without any jumps or jump targets in the middle, and the live information of each register that is provided by the compiler is the result of register allocation for the basic banks, estimating live time for each subset $SET_i$ is then reduced to find the time when any of its registers is live.

Figure 4:
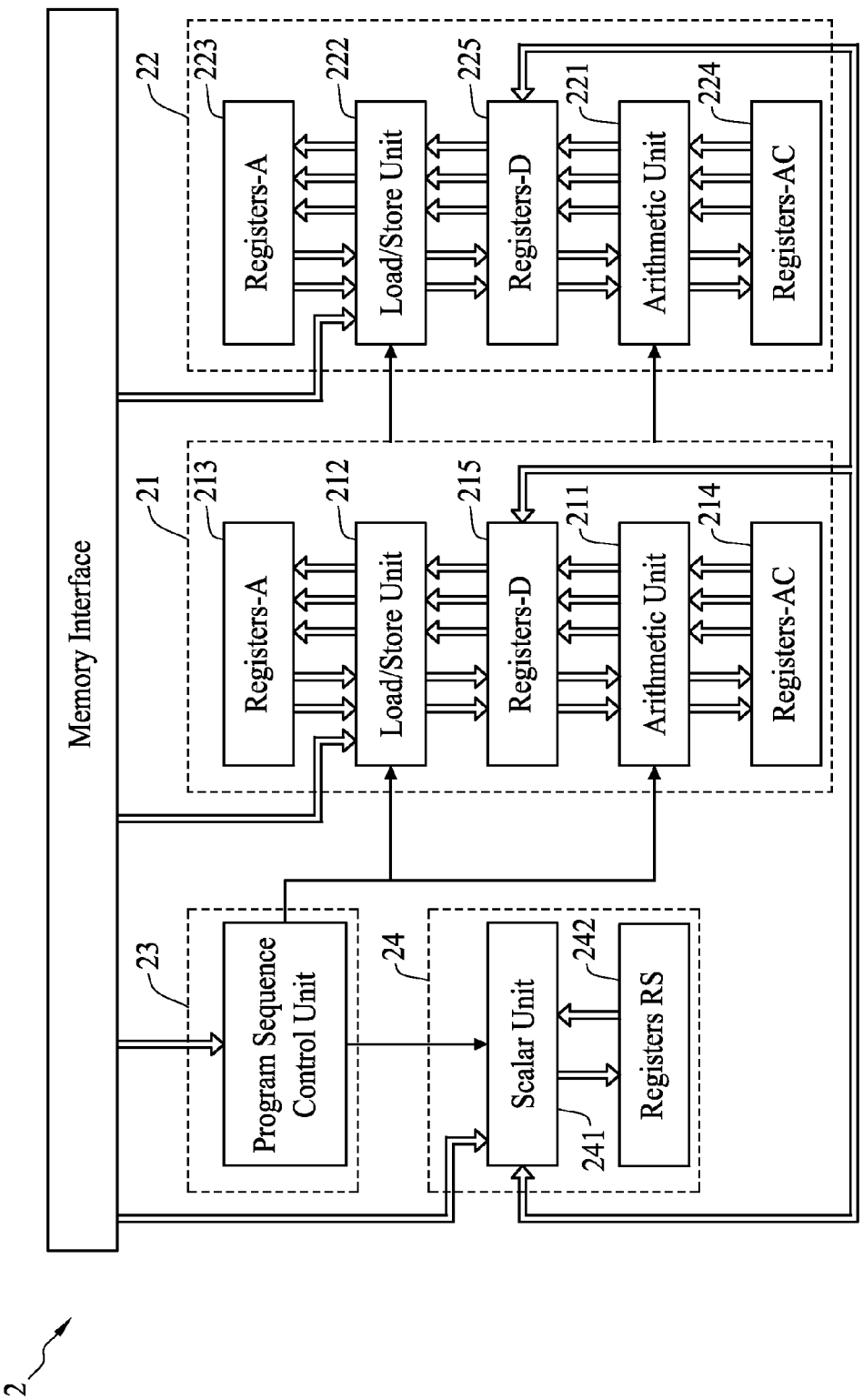
FIG. 4 shows a block diagram of a PAC DSP process with the heterogeneous five-way issue VLIW architecture.

FIG. 4 shows a block diagram of a PAC (parallel architecture core) DSP process 2 with the heterogeneous five-way issue VLIW architecture, which could be used to perform the method of optimizing multi-set context switch for embedded processors of the present invention. The PAC DSP process 2 includes two arithmetic units 211 and 221, two load/store units 212 and 222, a program sequence control unit 23 and a scalar group 24. The program sequence control unit 23 and the scalar group 24 are used to execute control flow instructions like branch and jump. The arithmetic units 211 and 221, and the load/store units 212 and 222 are organized in pairs, in which one load/store unit and one arithmetic unit form a cluster arrangement 21 (or 22) with associated register files to be logically appropriate for a complete data stream processing. The PAC DSP process 2 includes two clusters 21 and 22 to support common workload capacity of concurrent data streams in most applications. The program sequence control unit 23 is primarily used to process operations of control flow instructions, while the scalar unit 231 is capable of simple load/store, and address arithmetic to assist typical program flow control. The program sequence control unit 23 and the scalar group 24 are placed separately from data stream processing clusters (i.e., the two clusters 21 and 22), with its own register file. The registers in the PAC DSP processor 2 are organized into four distinct partitioned register files and placed as cluster structures, to reduce wire connections between functional units and registers so that chip area and power consumption may be decreased. The register files 213, 214, and 242 are private registers, which are directly attached to and only accessible by the load/store unit 212, the arithmetic unit 211, and the scalar unit 24, respectively. The register files 223 and 224 are private registers, which are directly attached to and only accessible by the load/store unit 222 and the arithmetic unit 221, respectively. The register file 215 (or 225) is shared within the cluster 21 (or 22) and can be used to communicate across the two clusters 21 and 22. In the design of the PAC DSP processor 2, the registers in each cluster are divided into three subsets; they are: registers-A 213 (or 223), registers-D 215 (or 225), and registers-AC 214 (or 224). Assume the live time of the k subsets in a basic bank (e.g., the cluster 21 or 22, k is equal to three in the current embodiment) is $t_i$, $i=1, 2 \ldots k$, and t is the execution time of the basic bank, the cost of the k-register set context switch for the basic bank BBi in a program on the PAC DSP processor 2 is estimated as in formula (2) below:

$$C_{BBi} = \frac{t_1}{t} \times C_{sl}(N_1) + \frac{t_2}{t} \times C_{sl}(N_2) + \frac{t_3}{t} \times C_{sl}(N_3) \quad (2)$$

Whereas a basic bank may be executed for several times, each factor $\alpha_i$ as the weight of $C_{BBi}$ should be used to evaluate the overall cost of context switch in a program. By performing profiling or compile-time analysis, the factor $\alpha_i$ could be set to reveal the effect of each basic bank on the cost of the whole system by modeling the effective cost of each basic bank as $\alpha_i \times C_{BBi}$. Therefore, the effective cost of the whole system can be evaluated by summing up the weighted cost of each basic bank with the comparison cost $C_{cmp}(k)$. Consequently, for a system with total k basic banks, the cost of the whole system CW is defined as in formula (3) below:

$$CW = C_{cmp}(k) + \sum_{i=1}^{k} \frac{\alpha_i}{\sum_{j=1}^{k} \alpha_j} \times C_{BBi} \quad (3)$$

For multiple tasks running on an embedded system, the importance of each task is different and can be determined by the programmer before runtime. The set selection used in the present invention for multiple programs is currently adopted by simply treating all programs in the whole system as one big combined program. The cost effect of each program $PRO_i$ to the whole system is modeled as $\beta_i \times C_i$ with a weight $\beta_i$ to represent the importance of the program $PRO_i$ and $C_i$ is the cost of context switch for the program $PRO_i$, which is similar to the definition of $C_{BBi}$ in formula (2).

A simple RISC system with six registers is taken as an example as follows. Assuming that there are two basic banks ($S_1$ and $S_2$) in the running program, the live range of the six registers (R1-R6) for the two basic banks are $S_1=\{(R1, 0, 13), (R2, 1, 13), (R3, 4, 10), (R4, 5, 11), (R5, 5, 9), (R6, 8, 10)\}$ and $S_2=\{(R1, 0, 10), (R2, 2, 12), (R3, 3, 8), (R4, 5, 10), (R5, 5, 9), (R6, 9, 9)\}$. First, the six registers are sorted according to the sum of their live ranges in each basic bank; for instance, the live range of the register R1 in the whole system is (13−0)+(10−0)=22, which is the longest live time among all the six registers. Then, the sorted result is stored in the base set S; S={R1, R2, R3, R4, R5, R6}. Next, the longest-live register R1 in the base set S is assigned to the subset $SET_1$ and others are assigned to the subset $SET_2$, while the subset $SET_3$ is set to be empty. The live time of the subset $SET_2$ in the first basic bank $S_1$ is 12 (i.e., from 1 to 13) and the live time of the subset $SET_1$ is from 0 to 13. Supposing that the system supports single load/store instructions, the cost of save/restore N registers $C_{sl}(N)$ in a subset can be evaluated by N×c+$t_{delay}$, where c is the cycle counts of issuing a load/store instruction and $t_{delay}$ is the latency of the whole load/store process. The cost for the first basic bank $S_1$ is then calculated as in expression (i) below:

$$\frac{13}{13} \times C_{sl}(1) + \frac{12}{13} \times C_{sl}(5) \quad (i)$$

The cost of the second basic bank $S_2$ is calculated in the same way, as in expression (ii) below:

$$\frac{10}{12} \times C_{sl}(1) + \frac{10}{12} \times C_{sl}(5) \quad (ii)$$

Assuming that the weight $\alpha_1$ of the first basic bank S1 is 13 and the weight $\alpha_2$ of the second basic bank S2 is 12. The cost for the whole system is the sum of the cost in the two basic banks multiplied with the weight plus the comparison cost $C_{cmp}$, as in expression (iii) below:

$$C_{cmp} + \frac{10}{12}\left(\frac{13}{13} \times C_{sl}(1) + \frac{12}{13} \times C_{sl}(5)\right) + \quad (iii)$$

-continued $$\frac{12}{25}\left(\frac{10}{12} \times C_{sl}(1) + \frac{10}{12} \times C_{sl}(5)\right)$$

In order to determine if the next register should be contained in the subset $SET_i$ or not, the next register in the base set S is assigned to the subset $SET_1$ that now contains the registers R1 and R2. The cost of the system is calculated as in express (iv) below:

$$C_{cmp} + \frac{10}{12}\left(\frac{13}{13} \times C_{sl}(2) + \frac{7}{13} \times C_{sl}(4)\right) + \quad (iv)$$

$$\frac{12}{25}\left(\frac{12}{12} \times C_{cl}(2) + \frac{7}{12} \times C_{sl}(4)\right)$$

Note that the value of expression (iv) is smaller than that of expression (iii), thus the register R2 is assigned to the subset $SET_1$. The process continues until the system of adding the next register in the base set S to the subset $SET_1$ produces a higher cost. In this example, the cost becomes higher while attempting to add the register R4 into the subset $SET_1$. When the first step is completed, the subset $SET_1$ contains the registers R1 and R2. The subsets $SET_2$ and $SET_3$ are determined in the same way. The result of three subsets is therefore: $SET_1=\{R1, R2\}$, $SET_2=\{R4, R3, R5\}$, and $SET_3=\{R6\}$.

Table 1 below shows the expectation values of the context-switch overhead of the method of optimizing multi-set context switch for embedded processors of the present invention and three comparative examples, in which the context-switch overhead uses DSPstone as the test programs. The compiler used for generating the live information needed by the live-range-sensitive context switch procedure is the complier (refer to "ORC2DSP: Compiler Infrastructure Supports for VLIW DSP Processors" by Cheng-Wei et al, Proceedings of 2005 IEEE International Symposium on VLSI design, Automation, and Test, Apr. 27-29, 2005, and "Compiler Supports and Optimizations for PAC VLIW DSP Processors" by Yung-Chia Lin et al, LCPC 2005, USA, October 2005) for PAC DSP based on Open64/ORC (refer to "Open Research Compiler for the Itanium Family", Tutorial at the 34th Annual Int'l Symposium on Microarchitecture, December 2001).

TABLE 1

|  | I | II | III | IV |
|---|---|---|---|---|
| Convolution | 175 | 172 | 214 | 165 |
| Adpcm | 197 | 191 | 214 | 179 |
| Complex Multiply | 204 | 195 | 214 | 177 |
| Complex Update | 224 | 219 | 214 | 210 |
| Dot Product | 190 | 189 | 214 | 173 |
| FIR | 176 | 172 | 214 | 168 |
| Firdim | 196 | 190 | 214 | 176 |
| Iir(1) | 197 | 191 | 214 | 172 |
| Iir(2) | 198 | 189 | 214 | 174 |
| Lms | 194 | 189 | 214 | 178 |
| Matrix 1 | 172 | 168 | 214 | 162 |
| Matrix 1 × 3 | 196 | 186 | 214 | 179 |
| Matrix 2 | 198 | 187 | 214 | 178 |
| N complex Updates | 201 | 192 | 214 | 188 |
| N real Update | 203 | 191 | 214 | 184 |
| Real Update | 176 | 172 | 214 | 170 |

The first three columns in Table 1 are the cases for the equal-sized two-set, the equal-sized three-set and the full context switch, respectively. The last column is the case using the present invention. It can be deduced from Table 1 that the result of Column II has a better theoretical improvement than Column I, and that Column IV (i.e., the present invention) has the best overhead reduction. Moreover, the anomaly of overhead increasing in some cases, such as Complex Update, could be avoided by the present invention since it can provide the optimized set selection to the analyzed programs.

The above-described embodiments of the present invention are intended to be illustrative only. Numerous alternative embodiments may be devised by persons skilled in the art without departing from the scope of the following claims.

What is claimed is:

1. A method of optimizing multi-set context switch for embedded processors, comprising the steps of:
   partitioning a plurality of registers into a plurality of register sets based on a live-range-sensitive context-switch procedure that is associated with a usage frequency of each of the plurality of registers;
   storing contents of first target registers according to live set information of a current task stored in a live-set-information register, wherein the first target registers are selected from the register sets;
   determining a next task by an operating system and updating the live set information stored in the live-set-information register according to the next task; and
   restoring contents of second target registers according to the updated live set information stored in the live-set-information register, wherein the second target registers are selected from the register sets, and wherein the live-range-sensitive context-switch procedure comprises the steps of:
   providing a base set comprising the plurality of registers and dividing the plurality of registers into a plurality of subsets, wherein the plurality of subsets are arranged in order;
   setting each of the subsets empty;
   providing a key subset comprising a longest-live register having the longest live time which is selected from the registers in the base set;
   generating a first system cost associated with the plurality of register sets;
   forming a second temporary subset using the key subset excluding the longest-live register and forming a first temporary subset using a preceding subset of the key subset union with the longest-live register;
   generating a second system cost associated with the first temporary subset, the second temporary subset and other subsets excluding the key subset and the preceding subset;
   updating the subsets according to the result of comparing the first system cost with the second system cost; and
   forming the register sets according to the subsets;
   wherein the register sets are arranged in order with the usage frequency of each of the register sets.

2. The method of optimizing multi-set context switch for embedded processors of claim 1, wherein the live set information is generated by the compiler.

3. The method of optimizing multi-set context switch for embedded processors of claim 1, wherein the step of updating the subsets comprises the steps of:
   updating the preceding subset with the first temporary subset and updating the key subset with the second temporary subset if the first system cost is larger than the second system cost; and
   removing the longest-live register from the base set.

4. The method of optimizing multi-set context switch for embedded processors of claim 1, wherein the longest-live register is updated by the compiler.

5. The method of optimizing multi-set context switch for embedded processors of claim 1, wherein the first system cost is associated with a comparison cost that is defined as a cost function of deciding a live register set before performing context switch, and a store-load cost that is the sum of products of each single cost and a corresponding living probability.

6. The method of optimizing multi-set context switch for embedded processors of claim 5, wherein the corresponding living probability of each register set is correlated to a live time of each register set over the total execution time of the multitasking operating system.

7. The method of optimizing multi-set context switch for embedded processors of claim 1, wherein the live-range-sensitive context-switch procedure is not terminated until each of the subset is determined.

8. A method of optimizing multi-set context switch for embedded processors, comprising the steps of:
   partitioning a plurality of registers into a plurality of register sets based on a live-range-sensitive context-switch procedure that groups the registers into the register sets based on usage frequencies of the registers and arranges the register sets in order with the associated usage frequencies;
   storing contents of first target registers according to live set information of a current task stored in a live-set-information register, wherein the first target registers are selected from the register sets;
   determining a next task by an operating system and updating the live set information stored in the live-set-information register according to the next task; and
   restoring contents of second target registers according to the updated live set information stored in the live-set-information register, wherein the second target registers are selected from the register sets, and wherein the live-range-sensitive context-switch procedure comprises the steps of:
      providing a plurality of subsets among which the plurality of registers are divided, wherein the plurality of subsets comprise a first subset comprising a longest-live register within the first subset, and a second subset having an index consecutive to an index of the first subset;
      calculating a first system cost associated with the plurality of subsets;
      moving the longest-live register from the first subset to the second subset temporarily;
      calculating a second system cost associated with the plurality of subsets; and
      confirming the move of the longest-live register from the first subset to the second subset if the first system cost is greater than the second system cost so as to form the register sets in accordance with the plurality of subsets.

9. The method of optimizing multi-set context switch for embedded processors of claim 8, wherein the live set information is generated by the compiler.

10. The method of optimizing multi-set context switch for embedded processors of claim 8, wherein in the live-range-sensitive context-switch procedure, the index of the second subset is smaller than that of the first subset.

11. The method of optimizing multi-set context switch for embedded processors of claim 8, wherein the longest-live register is updated by the compiler.

12. The method of optimizing multi-set context switch for embedded processors of claim 11, wherein the corresponding living probability of each register set is correlated to a live time of each register set over the total execution time of the multitasking operating system.

13. The method of optimizing multi-set context switch for embedded processors of claim 8, wherein the first system cost is associated with a comparison cost that is defined as a cost function of deciding a live register set before performing context switch, and a store-load cost that is the sum of products of each single cost and a corresponding living probability.

* * * * *